US007635925B2

(12) United States Patent
Frew et al.

(10) Patent No.: US 7,635,925 B2
(45) Date of Patent: Dec. 22, 2009

(54) ANALOG COMBINATION REGULATOR

(75) Inventors: Louis Frew, Glasgow (GB); Colin Bates, Lanark (GB)

(73) Assignee: ATMEL Corporation, San Jose, CA (US)

( * ) Notice: Subject to any disclaimer, the term of this patent is extended or adjusted under 35 U.S.C. 154(b) by 448 days.

(21) Appl. No.: 11/538,615

(22) Filed: Oct. 4, 2006

(65) Prior Publication Data

US 2008/0084195 A1    Apr. 10, 2008

(51) Int. Cl.
*H02J 1/10* (2006.01)
*H02J 3/38* (2006.01)
(52) U.S. Cl. .............................. 307/52; 307/53; 307/80
(58) Field of Classification Search ................ 323/282; 307/43, 45, 52, 53, 60, 80
See application file for complete search history.

(56) References Cited

U.S. PATENT DOCUMENTS

| 5,206,495 | A | | 4/1993 | Kreft |
| 5,777,903 | A | | 7/1998 | Piosenka et al. |
| 5,845,217 | A | | 12/1998 | Lindell et al. |
| 5,889,431 | A | * | 3/1999 | Csanky ........................ 327/543 |
| 5,929,416 | A | | 7/1999 | Dos Santos Pato et al. |
| 5,973,484 | A | | 10/1999 | Cho |
| 6,003,777 | A | | 12/1999 | Kowalski |
| 6,150,803 | A | * | 11/2000 | Varga ........................... 323/282 |
| 6,177,783 | B1 | | 1/2001 | Donohue |
| 6,225,708 | B1 | | 5/2001 | Furukawa et al. |
| 6,566,935 | B1 | | 5/2003 | Renous |
| 6,642,631 | B1 | * | 11/2003 | Clavette ....................... 307/52 |
| 6,724,588 | B1 | | 4/2004 | Cummings et al. |
| 6,933,772 | B1 | | 8/2005 | Banerjee et al. |
| 6,979,983 | B2 | | 12/2005 | Yen et al. |
| 7,109,691 | B2 | * | 9/2006 | Brooks et al. ................ 323/282 |
| 7,246,750 | B2 | * | 7/2007 | Cho ........................... 235/492 |

(Continued)

FOREIGN PATENT DOCUMENTS

EP    0 736 828    10/1996

(Continued)

OTHER PUBLICATIONS

Ayers, John E,; Digital Integrated Circuits Analysis and Design; Received at USPTO Aug. 17, 2004, CRC Press, pp. 261-264.*

(Continued)

*Primary Examiner*—Adolf Berhane
*Assistant Examiner*—Matthew Grubb
(74) *Attorney, Agent, or Firm*—Fish & Richardson P.C.

(57) ABSTRACT

Methods and apparatus may provide for multiple input voltage regulation in which a current supplied to an output node divides among voltage regulators according to their respective input voltages when the difference in input voltages falls within a voltage range. When the difference in input voltages falls outside of the voltage range, then the current to the output node is supplied substantially through the voltage regulator with the highest input voltage. In some implementations, the voltage range may be determined, at least in part, by a transistor gate-to-source threshold voltage characteristic. In one example, a dual input voltage regulator system in a combination smart card supplies current from contact and/or contactless (e.g., inductively coupled) power sources based on a relative voltage between the respective input voltages.

22 Claims, 5 Drawing Sheets

U.S. PATENT DOCUMENTS

| | | | |
|---|---|---|---|
| 7,332,896 B2 * | 2/2008 | Shin et al. ................... 307/80 |
| 7,554,383 B2 * | 6/2009 | Arisawa et al. ............. 327/530 |
| 2004/0210406 A1 | 10/2004 | Bui et al. |
| 2005/0046461 A1 | 3/2005 | Huang et al. |
| 2005/0150488 A1 * | 7/2005 | Dave ..................... 128/200.14 |
| 2006/0017423 A1 | 1/2006 | Frith et al. |
| 2006/0022640 A1 | 2/2006 | Frith et al. |
| 2008/0084195 A1 | 4/2008 | Frew et al. |

FOREIGN PATENT DOCUMENTS

| | | |
|---|---|---|
| EP | 1713185 | 10/2006 |
| WO | WO 97/49059 | 12/1997 |
| WO | WO 00/58815 | 10/2000 |

OTHER PUBLICATIONS

International Search Report dated Jan, 14, 2008 in PCT/US2007/079867, 10 pages.

* cited by examiner

ANALOG COMBINATION REGULATOR

TECHNICAL FIELD

Various implementations relate to electrical systems.

BACKGROUND

Electronic systems that may use digital and/or analog circuits, such as microprocessors, for example, generally operate when supplied with a supply voltage. Many electronic systems are designed to operate from supply voltages that are regulated to provide a voltage that is within a range of voltage suitable for the circuitry.

Voltage regulators may generally include devices that have an input coupled to a power source and an output coupled to a load. In operation, a voltage regulator may draw energy from the power source and deliver energy to the load at a regulated voltage. Generally, the voltages of the power source and the load may be substantially independent of each other, an the voltage may be substantially different. In normal operation, the voltage regulator operates to supply current to the load at a voltage within an operating range of a nominal voltage. Some voltage regulators may be specified to regulate the voltage supplied to the load to within a tolerance of, for example, 1%, 5%, or 10% of the nominal voltage.

The nominal voltage that the regulator supplies to the load may depend on the type of load being supplied. In some digital systems, a voltage regulator may supply a nominal voltage of, for example, 3.3 Volts or 5 Volts. In some analog systems, a voltage regulator may supply a nominal voltage of, for example, −5 Volts, 2.5 Volts, 5 Volts, or 12 Volts. Many other tolerances and/or nominal voltages are possible.

Voltage regulators may be of various designs. For example, some switched mode dc-to-dc converters may produce a regulated output voltage by rapidly storing and releasing energy into and out of an energy storage element (e.g., inductor, capacitor). Examples of some switched-mode voltage regulator topologies include charge pumps, boost, buck, buck-boost, flyback, SEPIC, Cuk, and forward converters. Another type of voltage regulator is a linear regulator. Examples of linear regulators may include series pass and shunt regulators.

SUMMARY

Methods and apparatus may provide for multiple input voltage regulation in which a current supplied to an output node divides among voltage regulators according to their respective input voltages when the difference in input voltages falls within a voltage range. When the difference in input voltages falls outside of the voltage range, then the current to the output node is supplied substantially through the voltage regulator with the highest input voltage. In some implementations, the voltage range may be determined, at least in part, by a transistor gate-to-source threshold voltage characteristic. In one example, a dual input voltage regulator system in a combination smart card supplies current from contact and/or contactless (e.g., inductively coupled) power sources based on a relative voltage between the respective input voltages.

Some implementations may provide one or more advantages. For example, some implementations may substantially mitigate potential misoperation that may result from transient power conditions. As such, robust performance may be maintained during shifts in the relative strengths of available power sources. In some implementations, smooth transitions of current division among the regulators for each of a number of independent power source inputs may substantially reduce or prevent, for example, data errors or other glitches. A single transistor drop architecture provides low drop-out voltage regulation capability without substantially increased transistor size. Some implementations may substantially prevent reverse current flow through regulators connected to inactive power inputs. In addition, low power operation may be achieved over a wide range of operating conditions by substantially reducing or preventing reverse (e.g., back feed) current flow through regulator transistors that are unselected or not coupled to active power sources. Performance may be enhanced in some implementations by selecting to draw electrical power from a highest available power source.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION OF ILLUSTRATIVE EXAMPLES

Figure 1:
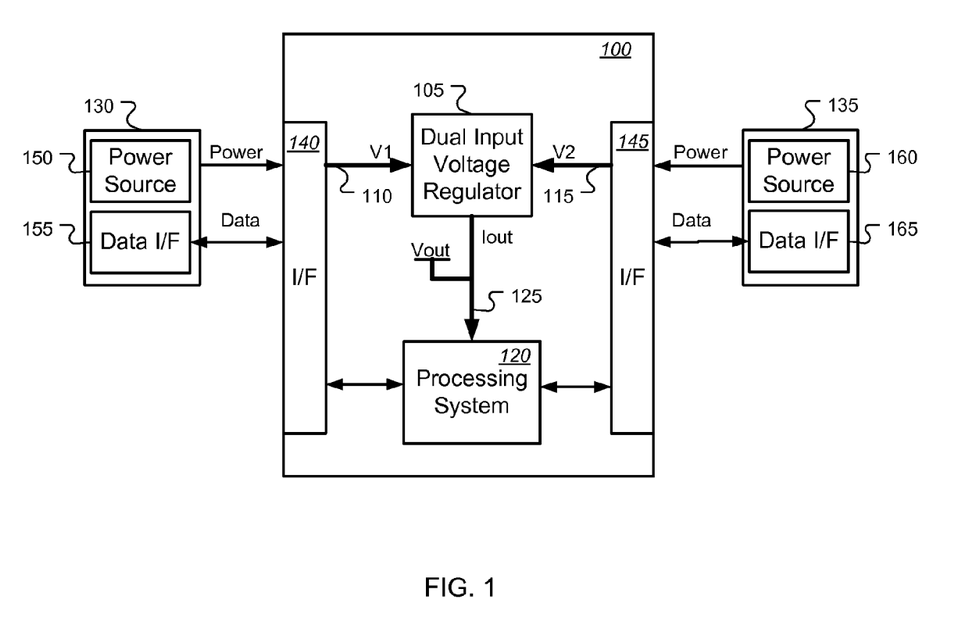
FIG. 1 shows an exemplary system that includes a dual input voltage regulator that is configured to receive power from multiple power sources.

FIG. 1 shows an exemplary system 100 that includes a dual input voltage regulator (DIVR) 105 that is configured to receive power from multiple (e.g., independent) power sources. The DIVR 105 receives input voltages V1, V2 from input nodes 110, 115, respectively, and supplies an output current Iout at a regulated voltage Vout to a device (e.g., processing system 120) at an output node 125. In one implementation, when V1 and V2 are within a circuit dependent window of each other, the DIVR 105 draws current from both input nodes 110, 115 to supply Iout. When the difference between V1 and V2 falls outside of the window, the DIVR 105 draws current from the input node 110 or 115 with the highest voltage input V1 or V2, respectively, to supply Iout. As such, the DIVR 105 may supply an output voltage Vout at the output node 125 with substantially reduced or eliminated transient effects, for example, as the input voltages V1, V2 independently vary (e.g., turn on, turn off, strengthen, weaken).

In some implementations, the DIVR 105 may include a transistor that is operated to substantially block reverse current from the output node 125 to one of the input nodes 110, 115. For example, when the difference between V1 and V2 falls outside of the circuit dependent window, reverse current flow to the input node 110, 115 with the lowest voltage input V1, V2 may be substantially blocked.

The system 100 receives power from external sources 130, 135, which are coupled to the system 100 through interfaces 140, 145, respectively. In the depicted example, the system 100 receives power and/or data from the sources 130, 135. In some implementations, one or both of the interfaces 140, 145 may convert received data signals into power signals to supply operating power to the processing system 120. In some examples, either of the interface 140, 145 may include separate or integrated power and data ports for coupling to the corresponding sources 130, 135.

In the depicted example, the source 130 includes a power source 150 and a data interface 155, and the source 135 includes a power source 160 and a data interface 165. The power sources 150, 160 may transmit power to the system 100 through the interfaces 140, 145, respectively. The data interfaces 155, 165 may communicate with the system 100 by transmitting and/or receiving data through the interfaces 140, 145, respectively.

In various implementations, the interfaces 140, 145 may be configured to receive wired signals and/or wireless signals.

In some examples, the system 100 may receive power and data from a cable interface (e.g., via a universal serial bus (USB) interface). In some examples, the processing system 120 may communicate with either or both of the sources 130, 135 through the corresponding interfaces 140, 145.

Some implementations may be integrated in smart cards. In some implementations, smart cards send and/or receive data by communicating with an appropriate reader system. Some cards, commonly called contact cards, communicate with reader systems when the card makes direct electrical connection to a reader system. Data signals communicated over such direct contact interfaces may conform to a particular communication protocol, such as ISO/IEC 7816 or ISO/IEC 7810 (ISO refers to the International Organization for Standardization; IEC refers to the International Electrotechnical Commission). Other cards, called contactless cards, can communicate wirelessly with reader systems using RF (radio frequency) signals. RF data signals used by a contactless card may conform to a particular communication protocol, such as ISO/IEC 14443 or ISO/IEC 15693.

Various types of power sources may supply the electrical power used to operate the circuitry in an integrated circuit card. For example, some cards are powered by an integrated power storage device, such as a battery or large value capacitor. Contact type cards can be powered by making direct electrical contact with terminals connected to a power source, which may be, for example, a power supply that is integrated in a reader system. Contactless type smart cards may be powered by capturing and storing radio frequency (RF) energy transmitted by a reader system.

A hybrid type of smart card, sometimes called a combination card, can exchange data through either direct electrical contact or RF coupling to a reader system.

In an illustrative example, the interface 140 may be a contact interface, and the interface 145 may be a wireless interface. The contact interface 140 may receive power from a primary battery, a secondary battery, and/or utility power. The wireless interface 145 may receive power by, for example, rectifying a received radio frequency (RF) signal such that the energy may be stored in a battery or capacitor.

The voltage provided from the power sources 150, 160 may vary independently. For example, V1 may be supplied by a relatively stiff voltage source in a contact reader device, and V1 may appear to be turned on when contact is made with the interface 140 and turned off when contact is broken with the interface 140. V2 may be supplied through electromagnetic coupling to a contactless reader device. In this example, V2 may vary substantially depend on the orientation of the antenna with respect to the field, the distance from the transmitter, the presence or absence of field-distorting objects (e.g., metallic and/or lossy dielectric objects), signal reflections, humidity, and the like. Accordingly, V2 may vary among being less than, substantially near, or greater than V1.

As such, the difference between V1 and V2 may sometimes be within the circuit dependent window (e.g., 0.2V, 0.3 V, 0.4V, 0.5 V, 0.6V, 0.7V, 0.8V, 0.9V, 1 V, etc.). Sometimes, the difference between V1 and V2 may be outside of the circuit dependent window. In one implementation, when V1 and V2 are within the window, the DIVR 105 draws power from both power sources 150, 160. When V1 and V2 are outside of the window, the DIVR 105 draws power substantially from the power source 150 or 160 supplying the highest voltage V1 or V2, respectively.

In an illustrative example, the interface 140 receives battery power and the interface 145 receives RF power. V1 is initially constant and V2 is initially unpowered such that (V1−V2) is outside of a circuit dependent window. The DIVR 105 draws current substantially from the input node 110 to supply Iout. Additionally, substantially no current flows through the input node 115. As RF field strength increases (e.g., when the interface 145 is brought substantially close to the RF source 135), V2 increases and, therefore, (V1−V2) decreases. When (V1−V2) is within the window, the DIVR 105 supplies Iout using current from both input nodes 110, 115. In certain implementations, the amount of current draw from the input nodes 110, 115 is directly related to V1, V2. As the RF field strength continues to increase, V2 may become greater than V1 such that (V1−V2) is outside of the window. When (V1−V2) is outside of the window and V2>V1, the DIVR 105 draws current substantially from the input node 115. Examples of current transitions relative to the differences between V1 and V2 are described with reference to FIG. 3.

Figure 2:
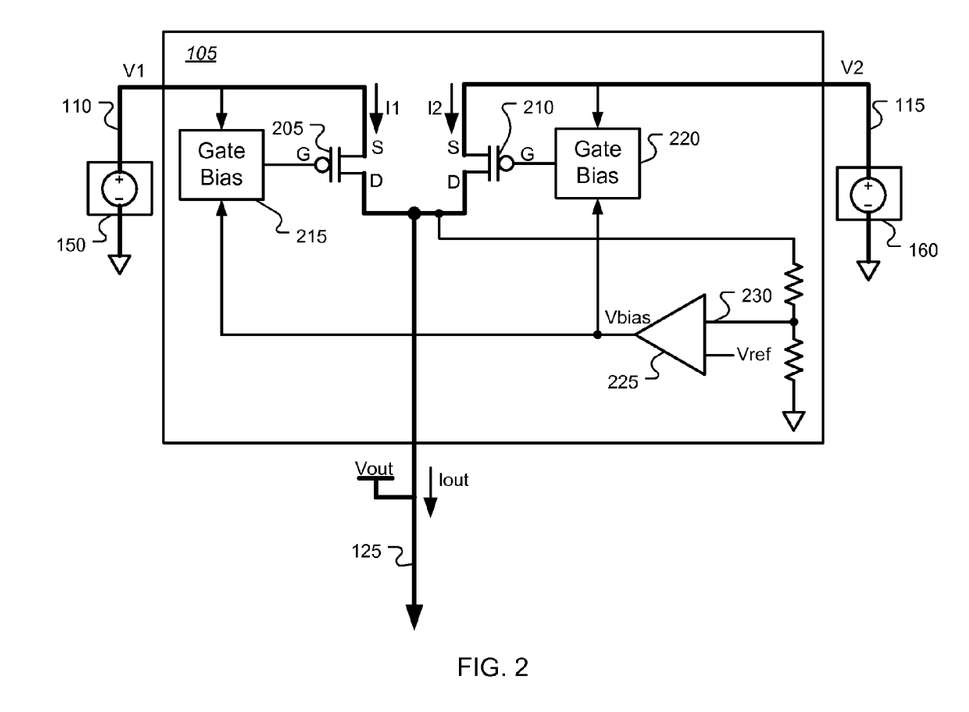
FIG. 2 illustrates an example of a dual input voltage regulator that is configured to transition between multiple power sources.

FIG. 2 illustrates an example of the DIVR 105 that is configured to transition current supplied by the power sources 150, 160 as their relative voltages vary. The DIVR 105 includes a transistor 205 to regulate voltage supplied from the input node 110, and a transistor 210 to regulate voltage supplied from the input node 115. The DIVR 105 produces the regulator output voltage Vout at the drain terminal of the transistors 205, 210, which are coupled to the output node 125. As shown in FIG. 2, the output current Iout is supplied from either or both current paths indicated by the currents I1, I2 through the transistors 205, 210. The currents I1, I2 are controlled by the gate to source voltage (Vgs) of the transistors 205, 210. The supplied gate voltage is controlled such that Iout is continuously supplied by I1 and/or I2 during operation.

The DIVR 105 includes gate bias circuits 215, 220 to control gate voltages at the transistor 205 and the transistor 210, respectively. The gate bias circuits 215, 220 can regulate Vout by controlling the gate voltages. In the depicted example, the transistors 205, 210 are p-channel enhancement type metal-oxide-semiconductor field-effect transistor (PMOS). When Vgs is greater than a circuit dependent voltage threshold (Vt), the PMOS transistors 205, 210 may be turned off and may conduct substantially no current. When Vgs is less than Vt, the PMOS transistors 205, 210 may be turned on and may conduct a current from source to drain. In various implementations, Vt may depend on the type of transistors and other circuit elements. Typically, Vt of a PMOS transistor may range from, for example, about −4 V to about 0 V.

The gate bias circuits 215, 220 control the supplied gate voltages to allow transitions (e.g., smooth transitions) between the power sources 150, 160. The gate bias circuit 215 is supplied by voltage V1, and the gate bias circuit 220 is supplied by voltage V2. In certain conditions, such as when V1 is approximately equal to V2, the gate bias circuits 215, 220 may supply substantially the same gate voltage to the transistors 205, 210.

The gate bias circuits 215, 220 may control I1 and I2 based on the relative differences between V1 and V2. During operation, when either the voltage V1 or V2 is too low relative to the gate voltage to satisfy the threshold voltage condition (e.g., Vgs>Vt), then the corresponding current path is turned off.

When both V1 and V2 are above the supplied gate voltage, the operation of the DIVR 105 depends on the relative difference between V1 and V2. For example, when the voltages V1 and V2 are within the window, the transistors 205, 210 may allow the currents I1, I2 to flow through the transistors 205, 210 to supply Iout because Vgs is below Vt. Based on V1 and V2, the magnitude of the currents I1, I2 vary. For example, when V1 is greater than V2, I1 is greater than I2. When the voltages V1 and V2 are outside of the window, Vgs may be controlled such that Iout is supplied substantially by the source 150 or 160 with the highest input voltage V1, V2. For example, when V1>V2, and V1 and V2 are outside of the window, Iout is supplied substantially by the source 150.

The gate bias circuits 215, 220 generate the gate voltages based on a control signal Vbias received from an operational amplifier 225 and the voltages V1, V2, respectively. The operational amplifier 225 receives a reference input and a feedback input at a node 230. The transistors 205, 210, the gate bias circuits 215, 220, and the operational amplifier 225 combine to form a feedback circuit to regulate Vout and control the currents I1, I2 in the current paths. In certain implementations, the feedback circuit operates to control the Vgs of the transistors 205, 210 so that the DIVR 105 draws currents simultaneously from the input nodes 110, 115 when V1 and V2 are within the window, depending on Vout. Based on V1, V2, and Vout, the feedback circuit generates gate bias voltages for the transistors 205, 210 to regulate Vout and to smoothly transition current flow through transistors 205, 210 as voltages of the power sources 150, 160 vary. When V1 and V2 are out of the voltage window, the feedback circuit may control Vgs at the transistors 205, 210 so that substantially all Iout flows through the transistor coupled to the highest available input voltage V1, V2.

Figure 3:
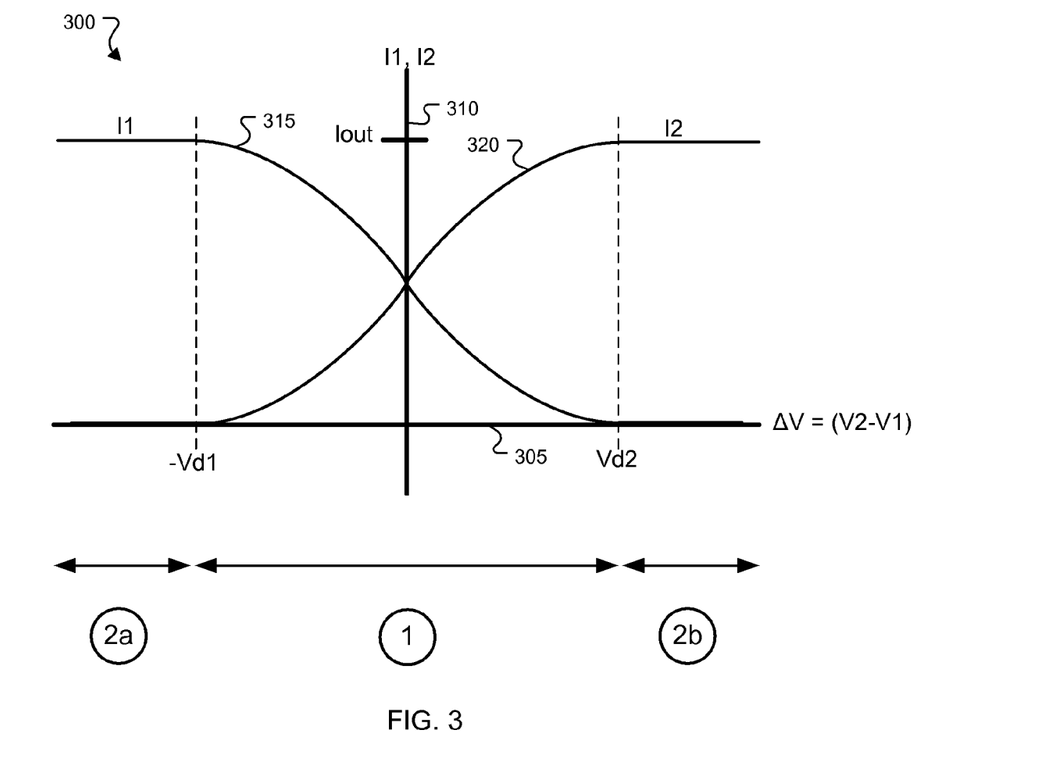
FIG. 3 is a graph showing an example of current transitioning as the voltage of one power source varies relative to another power source.

FIG. 3 is an example graph 300 that illustrates current transitioning (e.g., smoothly) as the voltage differential (V2-V1=ΔV) varies over a range. The graph 300 includes a horizontal axis 305 representing the quantity of ΔV and a vertical axis 310 representing the currents I1, I2 through the transistors 205, 210 of FIG. 2.

In the graph 300, lines 315, 320 plot the characteristics of I1, I2 over a range of ΔV. In the DIVR 105, Iout=I1+I2. In the example shown, I1 and I2 change smoothly and continuously over the range of ΔV. For example, there are no abrupt discontinuities in the plots 315, 320. As such, Iout is continuously supplied by at least one power supply. Accordingly, in some examples, the DIVR 105 may advantageously supply the output current Iout with substantially reduced glitches. Particularly, in response to transitions in the input voltages V1, V2. For example, when the power source 160 is removed suddenly from the system 100, forcing the DIVR 105 to transition from supplying current from the power source 160 to supplying current from the power source 150, the transition may occur smoothly with substantially reduced glitches.

As shown in FIG. 3, the graph 300 shows three regions of operations. When ΔV is within the circuit dependent window between -Vd1 and Vd2, including -Vd1 and Vd2, the DIVR 105 operates in a region 1. When ΔV is less than -Vd1, the DIVR 105 operates in a region 2a. When ΔV is greater than Vd2, the DIVR 110 may operate in region 2b.

When the DIVR 105 is operating in the region 1, the power sources 150, 160 may supply Iout simultaneously. As shown in the graph 300, the DIVR 105 draws currents I1 and/or I2 to supply Iout. At ΔV=-Vd1, the DIVR 105 may draw substantially only I1 to supply Iout such that I1 is substantially equal to Iout. As ΔV increases, I2 increases and I1 decreases such that approximately I1+I2=Iout. At ΔV=Vd2, the DIVR 105 may draw substantially only I2 to supply Iout such that I2 is substantially equal to Iout. The window width is the range from -Vd1 to Vd2. In some examples, the Vd1 and Vd2 may be the same (e.g., |Vd1|=|Vd2|=0.4 V). In other examples, the thresholds Vd1, Vd2 of the power sources 150, 160 may not be symmetric. For example, Vd1 may be about 0.6 V and Vd2 may be about 0.4 V. Vd1 and Vd2 are and may be determined based on circuit dependent characteristics, such as gate to source thresholds of the transistors 205, 210. In an illustrative example, process parameter variations may contribute to variations of Vt (e.g., about +/−100 mV). Various other factors may also contribute to window width. In some examples, Vt may increase as temperature decreases and/or as voltage from source to drain of a PMOS device increases. In addition, device matching may contribute to window width.

When the DIVR 105 is operating in the region 2a, the power source 150 supplies substantially all of Iout and the current path coupled to the power source 160 supplies little or no current. In the depicted example, I2 is substantially zero but remains non-negative in the region 2a. When the DIVR 105 is operating in the region 2b, the power source 160 provides substantially all of Iout and the current path coupled to the power source 150 supplies little or no current. In the depicted example, I1 is substantially zero but remains non-negative in the region 2b.

As an illustrative example, suppose the DIVR 105 is regulating the output node 125 to 2.5V while supplying a load current of about 1.7 mA. Assume the power source 150 is supplying V1 to a substantially constant voltage 3.7 V, and V2 is ramping up from 0 V to 6 V. Initially, the DIVR 105 is operating in the region 2a. When V2 ramps up from 0 V to about (3.7−Vd1) V, the DIVR 105 continues to operate in the region 2a and substantially all Iout is supplied from I1 (e.g., I1 is substantially 1.7 mA, and I2 is substantially zero and non-negative). When V2 and V1 are within the window (e.g., V2 is greater than (3.7−Vd1) V but less than (3.7+Vd2) V), the DIVR 105 operates in the region 1 and Iout is supplied simultaneously from I1 and I2. In the example shown for the region 1, the contribution of I1 decreases and the contribution of I2 increases as V2 increases. In various implementations, the sum of I1 and I2 is substantially equal to Iout while ΔV is in the operating region 1. As shown, the contribution of I1 decreases smoothly (e.g., monotonically) and the contribution of I2 increases smoothly (e.g., monotonically) as V2 ramps up. In certain implementations, such as when V1 substantially equals V2, the power supplies 150, 160 share the load current substantially equally (e.g., I1=I2=850 μA). When V2 is greater than (3.7+Vd2) V, the DIVR 105 operates in the region 2b and substantially all Iout is supplied from I2 (e.g., I2 is substantially 1.7 mA, and I1 is substantially zero and non-negative).

Figure 4:
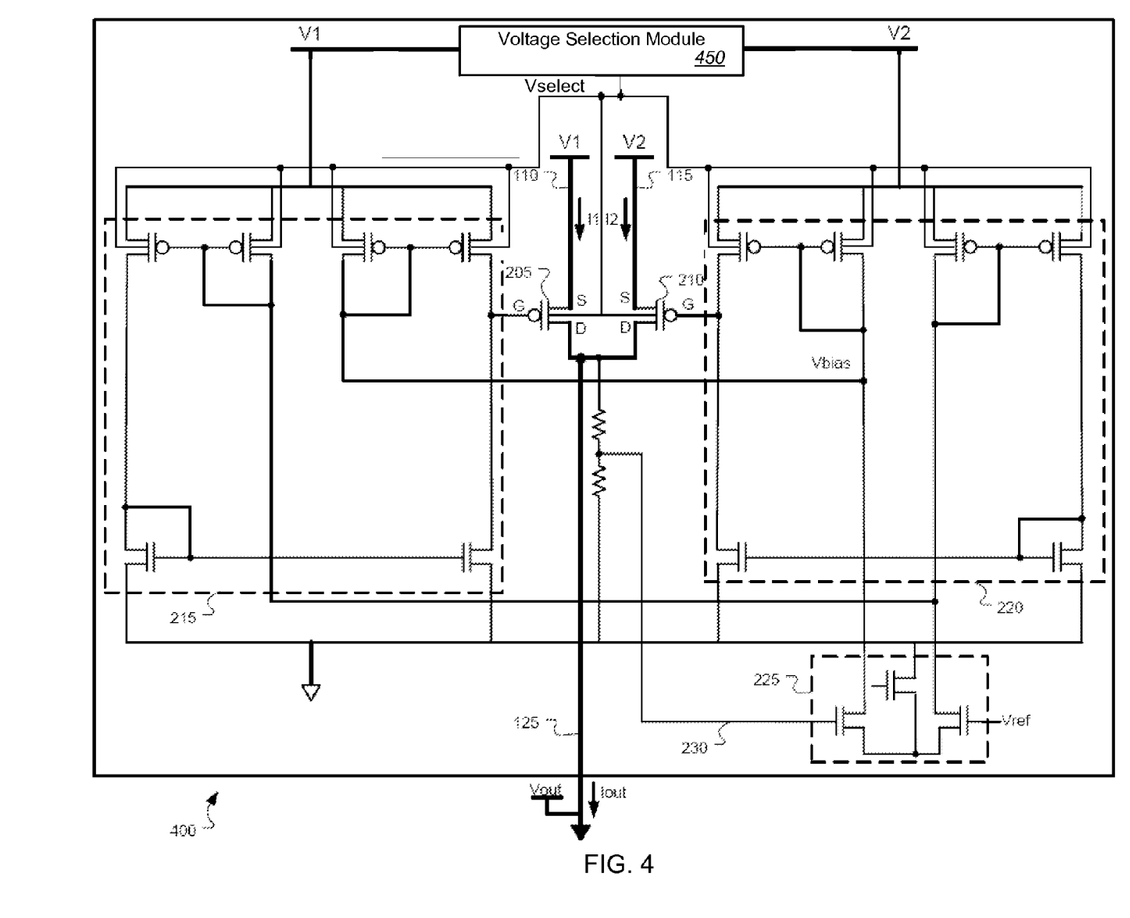
FIG. 4 shows a schematic of an exemplary circuit that implements a dual input voltage regulator using PMOS and NMOS transistors.

FIG. 4 shows a schematic of an exemplary circuit 400 that implements the DIVR 105 described with reference to FIG. 2. The circuit 400 shows the bias circuits 215, 220 and the operational amplifier 225 in additional detail. In some implementations, the circuit 400 may be implemented using discrete and/or integrated components, or any combination thereof.

As described with reference to FIG. 2, the DIVR 105 regulates the output voltage Vout and supplies a current Iout at the output node 125 and the DIVR 105 draws the currents I1, I2 from the input nodes 110, 115, respectively. The transistors 205, 210 can control the currents I1, I2 in the first and the second current paths, respectively, based on the gate voltage at the transistors 205, 210 supplied by the gate bias circuits 215, 220.

Under certain conditions, the gate bias circuits 215, 220 may supply substantially similar gate voltages to the gates of the transistors 205, 210. The gate circuits 215, 220 are supplied by voltages V1, V2, respectively. As such, the gate bias supplied by each of the gate bias circuits 215, 220 may each depend on the corresponding supplied voltages V1, V2. In the depicted example, the gate bias circuits 215, 220 are responsive to the control signal Vbias from the operational amplifier 225. Within the limits associated with the supplied voltage V1, V2, in this example, the gate bias circuits 215, 220 may be responsive to Vbias to generate the gate voltages to the transistors 205, 210, respectively.

When the difference between V1 and V2 is within the window (e.g., the voltage region 1 in FIG. 3), the gate bias circuits 215, 220 are configured to allow I1 and I2 to combine to supply Iout. When the difference between V1 and V2 is outside of the window (e.g., the voltage regions 2a and 2b in FIG. 3), the gate bias circuits 215, 220 are configured such that substantially all Iout is supplied through the transistor 205, 210 that has its source coupled to the higher voltage as between V1, V2.

The gate bias circuits 215, 220 can also regulate the output voltage Vout using Vbias. To generate Vbias, the operational amplifier 225 uses a received feedback voltage and an input Vref. The received feedback voltage is directly related to Vout. According to Vref and the feedback voltage, the operational amplifier 225 outputs a voltage Vbias to the gate bias circuits 215, 220. Based on Vbias, V1, and V2, the gate bias circuit 215, 220 allows currents I1, I2 to supply Iout, or enables only one current path to supply Iout and substantially blocks reverse current.

When only one of V1, V2 is lower than a (e.g., circuit dependent) threshold, the operational amplifier 225 can control the gate bias circuits 215, 220 to substantially block current flow through that transistor 205 or 210. Factors that may affect a circuit dependent threshold include, but are not limited to, the characteristics (e.g., threshold voltage) of the transistors used to implement the gate bias circuits 215, 220 and the control voltage output by the operational amplifier 225. In an illustrative example, suppose the transistor 205 is switched off. The circuit 400 may substantially prevent reverse current flowing from the output node 125 to the input node 110 by turning off the transistor 205. As such, the output current Iout is substantially supported by the current I2, and I2 does not supply a backfeed current through the transistor 205.

When both V1 and V2 are above the circuit dependent threshold, the gate bias circuits 215, 220 can control the currents I1 and I2 flowing through the transistors 205, 210 using Vbias generated by the operational amplifier 225. The current I1, I2 may depend, for example, on whether the difference between V1 and V2 is inside or outside of the window.

If the difference between V1 and V2 is inside of the window, then the operational amplifier 225 may control the gate bias circuits 215, 220 to enable both current paths to conduct the currents I1, I2 via the transistors 205, 210. If the difference between V1 and V2 is outside of the window, then the operational amplifier 225 may control the gate bias circuits 215, 220 to enable the current path with the highest voltage to substantially supply the current Iout. The relative amplitudes of currents I1, I2 may be directly related to the relative voltage V1 and V2. In some examples, for a particular differential voltage, the relative current division between the current paths may remain substantially constant as the load current varies. The ratio of currents I1, I2 may vary over a range of voltage difference between V1 and V2, as shown in the graph 300.

The circuit 400 also includes a voltage selection module 450 that selects a highest voltage between the supply voltages, V1 and V2. The voltage selection module 450 receives the supply voltages and generates an output voltage at a node Vselect. In the depicted example, the output voltage is supplied to body terminals of PMOS transistors of the bias circuits 215, 220.

As V1 and V2 vary, the output voltage at Vselect may provide substantially the highest supply voltage available from the two supply voltages V1, V2. The Vselect may provide substantially the highest available voltage to the body terminals of the PMOS transistors. For example, supplying the highest available voltage to the substrates of the PMOS devices may, for example, substantially reduce or prevent unintentional forward bias of internal junctions in the PMOS transistors. Furthermore, Vselect may, in some implementations, contribute to reducing and/or preventing reverse current flow, for example, through a source-bulk of unused output PMOS devices. Some examples of the voltage selection module 450 are described in further detail with reference to FIGS. 5A-B.

Figure 5A:
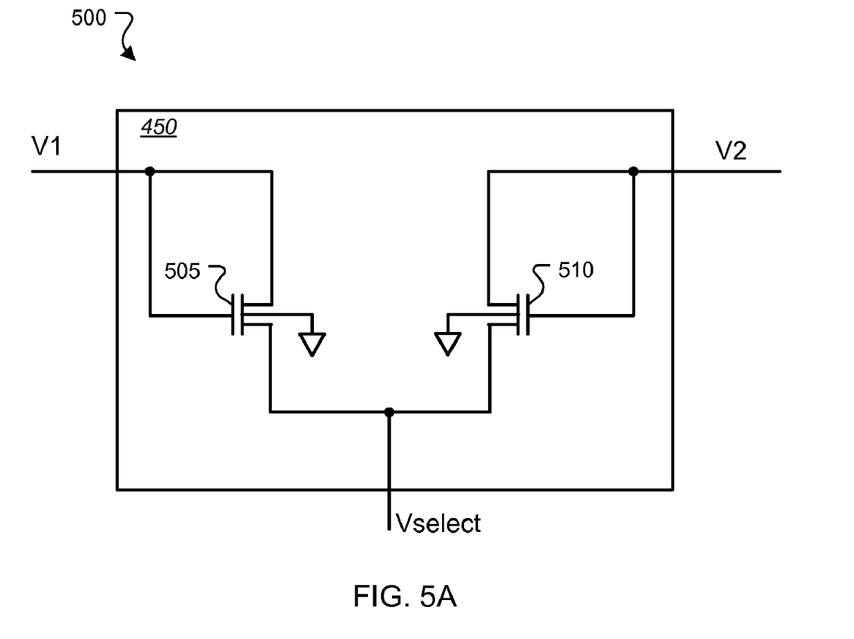
FIGS. 5A-B show exemplary implementations of a voltage selection module.
Figure 5B:
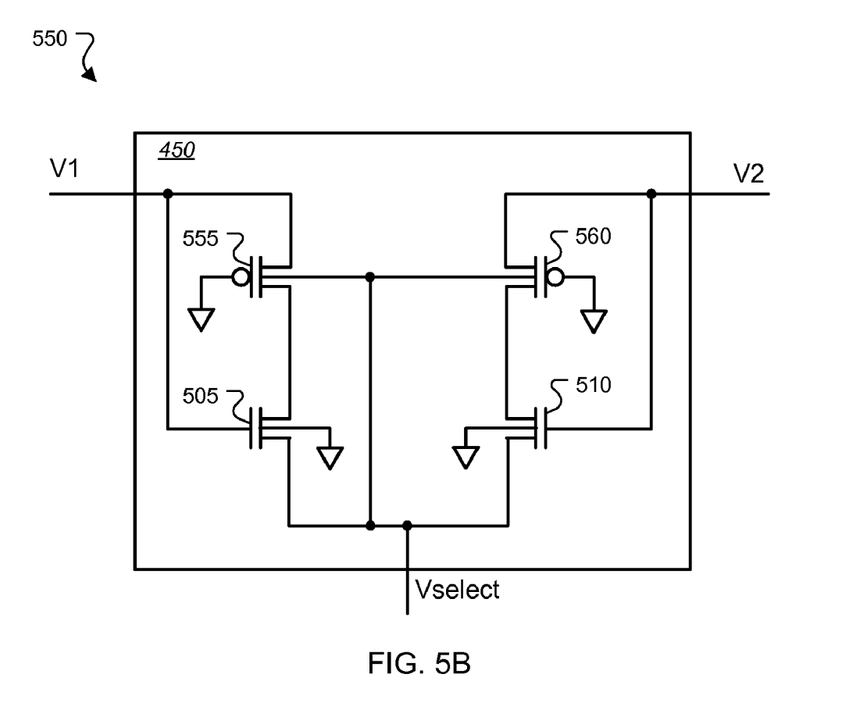

FIGS. 5A-B show exemplary circuits 500, 550 that implement the voltage selection module 450. As shown in FIG. 5A, the circuit 500 includes two NMOS transistors 505, 510 connected to the voltage supplies V1 and V2, respectively. The circuit 500 may supply the higher of V1 and V2 to an output node Vselect. As described in an example with reference to FIG. 4, the Vselect voltage may be supplied to the substrates (e.g., body connection) of various PMOS transistors in the bias circuits 215, 220 and/or the transistors 205, 210, for example. In some implementations, supplying the highest available voltage to the PMOS substrates may substantially prevent unintentional forward bias of internal junctions in the PMOS transistors.

In some implementations, the NMOS transistors 505, 510 may have substantially zero Vt. In some implementations, the NMOS transistors 505, 510 may have a positive threshold voltage (e.g., Vt up to at least about 1 V). In some examples, Vds of the NMOS transistors 505, 510 may be directly related to Vt. A small Vt at the NMOS transistors 505, 510 may induce a small voltage drop across the drain terminals and the source terminals (Vds), for example.

In operation, the voltage selection module 450 may select a highest voltage between V1 and V2 at Vselect. For example, suppose Vt is substantially 0 V. When V1>V2, the voltage at Vselect may be approximately V1 and the NMOS transistor 510 may be turned off because Vds at the NMOS transistor 510 (which is Vselect−V2) is less than Vt (which is substantially 0 V). When V2>V1, the voltage at Vselect may be approximately V2 and the NMOS transistor 505 may be turned off because Vds at the NMOS transistor 505 (which is Vselect−V1) is less than Vt (which is substantially 0 V).

As shown in FIG. 5B, the circuit 550 includes PMOS transistors 555, 560. The circuit 550 may provide advantages, such as additional reverse current protection when using NMOS devices with a Vt of approximately 0, for example. In various implementations, PMOS devices may facilitate achieving reduced dropout voltage and/or reduced size.

Alternatively, other implementations of the voltage selection module 450 may be used. For example, a voltage selection module may be implemented to select a lowest input voltage as the output using PMOS with substantially zero Vt.

Although an example of a system, which may be portable, has been described with reference to the above figures, other implementations may be deployed in other applications, such as other circuit applications, computing applications, network applications and the like.

In certain implementations, the system 100 may obtain power from more than two power sources. For example, using the same technique, the DIVR 105 may regulate Vout using three or more power sources. By controlling the gate voltage of each of the PMOS transistors that regulate the input voltages, the DIVR 105 may control current division among each of the power sources. When the input voltages are out of a voltage range, the output power is supplied by a power source with the highest input voltage. Additionally, reverse current flow may be substantially prevented for each of the multiple sources by appropriate biasing of the corresponding transistors.

In implementations with more than two voltage regulators, various operating modes may be used. For example, the DIVR 105 may receive currents from more than two input nodes, such as three or more voltage inputs. Each input can be controlled by a gate bias circuit responsive to the Vbias signal generated from the operational amplifier 225. When more than one voltage is above the circuit dependent threshold, for example, the gate bias circuits may control the amount of current flowing through each current paths based on the relative voltage difference between the input voltages.

In some other implementations, current regulators may be substituted for voltage regulators, for example, by replacing the opamp circuit 225 (see FIG. 2) with a current comparator, and comparing a reference current with the delivered load current.

In some implementations, the DIVR 105 can be configured to use voltage supplies that are negative with respect to a circuit reference voltage (e.g., ground). For example, the DIVR 105 may use N-channel MOS transistors for such negative voltages. When the DIVR 105 is supplied by the negative voltages, the gate bias circuits 215, 220 may select an active current from the input nodes 110, 115 having the lowest (e.g., most negative) voltage when the difference between the input voltages are out of the window. When the difference between the input voltages are inside of the window, the gate bias circuits 215, 220 may allow multiple (e.g., both) current paths to simultaneously support the output current. In some implementations, the linearity may be sufficient to substantially avoid dithering when operating in or around the edges of the window. In some implementations, a selective window feature could optionally be implemented to temporarily lock one of the regulators in its current state (e.g., to supply all the load current Iout). Such an implementation may be advantages, for example, if the V1 source provides limited stability or poor disturbance rejection at an operating point around which V2 may operate.

Although particular features of an architecture have been described, other features may be incorporated to improve performance. For example, other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades). One or more communication interfaces may be provided in support of data storage and related operations.

Some systems may be implemented as a computer system that can be used with implementations of the invention. For example, various implementations may include digital and/or analog circuitry, computer hardware, firmware, software, or combinations thereof.

In various implementations, the system 100 may communicate using suitable communication methods, equipment, and techniques. For example, the system 100 may communicate with compatible devices (e.g., devices capable of transferring data to and/or from the system 100) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using uni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

A number of implementations of the invention have been described. Nevertheless, it will be understood that various modifications may be made without departing from the spirit and scope of the invention. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof, and some implementations may be performed on modules or hardware not identical to those described. Accordingly, other implementations are within the scope of the following claims.

What is claimed is:

1. A system comprising:
a first current path providing a first current $I_1$ between a first supply node and an output node;
a second current path providing a second current $I_2$ between a second supply node and the output node; and
a control circuit to regulate a voltage at the output node by supplying a control signal to each current path, the control circuit being operable to divide a current supplied to the output nodes along said current paths when a difference between a voltage at the first supply node and a voltage at the second supply node falls within a voltage range, the division defined by a function characterized by three regions bound by two threshold voltage levels including a first, second and third region where $I_1 > I_2$ in the first region,
$I_1 = I_2$ in the second region, and
$I_1 < I_2$ in the third region,
and otherwise to supply substantially all the output current from the supply node with the higher voltage.

2. The system of claim 1, wherein current supplied to the output node transitions substantially smoothly from the first current path to the second current path as voltage at the second supply node increases within the voltage range.

3. The system of claim 1, wherein current supplied to the output node transitions substantially smoothly from the second current path to the first current path as voltage at the first supply node increases within the voltage range.

4. The system of claim 1, wherein the control circuit divides the current by supplying the control signal to bias a transistor in one of the current paths.

5. The system of claim 4, wherein the first current path comprises a first PMOS transistor having a source terminal connected to the first supply node.

6. The system of claim 5, wherein the second current path comprises a second PMOS transistor having a source terminal connected to the second supply node.

7. The system of claim 6, wherein the output node connects to a drain terminal of the first PMOS transistor in the first current path and to a drain terminal of the second PMOS transistor in the second current path.

8. The system of claim 7, wherein the control circuit provides a bias signal to modulate the first and second PMOS transistors.

9. The system of claim 6, further comprising gate bias circuits to supply substantially a same voltage to a gate terminal of the first PMOS transistor and to a gate terminal of the second PMOS transistor when the difference is characterized by the second region.

10. The system of claim 1, further comprising a smart card including the first current path, the second current path, and the controller.

11. The system of claim 1, wherein the voltage range spans up to about 1 Volt.

12. The system of claim 1, wherein the voltage range spans between about 0.2 Volts and about 0.8 Volts.

13. The system of claim 1, wherein the first current path and the second current path each comprise a junction field effect transistor.

14. The system of claim 1, wherein the first current path and the second current path each comprise a bipolar junction transistor.

15. A method comprising:
  receiving a first voltage at a first input of a voltage regulator;
  receiving a second voltage at a second input of the voltage regulator;
  regulating a voltage at an output of the voltage regulator; and
  supplying current to the output substantially only from an input with a higher input voltage when a difference between the first voltage and the second voltage falls outside of a voltage range, and supplying current to the output such that a current supplied from each of the first and second inputs divides according to voltages at their respective inputs when a difference between the first and second voltage falls within the voltage range.

16. The method of claim 15, wherein the voltage range depends substantially on a gate-to-source threshold voltage of a transistor.

17. The method of claim 15, wherein the voltage range comprises a voltage difference between a first trigger and a second trigger where each trigger defines a transitional threshold from supplying current from only one input to supplying at least a portion of current from both the first and second input, the difference selected from of a group consisting of: about 0.1, about 0.2, about 0.3, about 0.4, about 0.5, about 0.6, about 0.7, about 0.8, about 0.9, and about 1.0 Volts.

18. The method of claim 15, further comprising supplying power to the first input through physical contact with a connector.

19. The method of claim 15, further comprising supplying power to the second input through a wireless interface.

20. The method of claim 15, further comprising transferring data through an interface operable to receive the first voltage.

21. The method of claim 20, further comprising transferring data through an interface operable to receive the second voltage.

22. The method of claim 15, further comprising selecting a highest available voltage at the first and second inputs to bias a substrate of a transistor in the voltage regulator.

\* \* \* \* \*

UNITED STATES PATENT AND TRADEMARK OFFICE
CERTIFICATE OF CORRECTION

PATENT NO.        : 7,635,925 B2                                Page 1 of 1
APPLICATION NO.   : 11/538615
DATED             : December 22, 2009
INVENTOR(S)       : Louis Frew and Colin Bates It is certified that error appears in the above-identified patent and that said Letters Patent is hereby corrected as shown below:

First page, column 2 (Other Publications), line 1, please replace "Ayers, John E,:"
with --Ayers, John E.;--

Column 1, line 21, please replace "an" with --and--

Signed and Sealed this

Ninth Day of March, 2010

David J. Kappos
*Director of the United States Patent and Trademark Office*